(12) United States Patent
Harrison (10) Patent No.: US 11,269,058 B2
(45) Date of Patent: Mar. 8, 2022

(54) AUTOENCODER ASSISTED RADAR FOR TARGET IDENTIFICATION

(71) Applicant: Metawave Corporation, Palo Alto, CA (US)

(72) Inventor: Matthew Paul Harrison, Palo Alto, CA (US)

(73) Assignee: Metawave Corporation, Palo Alto, CA (US)

( * ) Notice: Subject to any disclaimer, the term of this patent is extended or adjusted under 35 U.S.C. 154(b) by 442 days.

(21) Appl. No.: 16/440,969

(22) Filed: Jun. 13, 2019

(65) Prior Publication Data
US 2019/0383904 A1 Dec. 19, 2019

Related U.S. Application Data

(60) Provisional application No. 62/684,688, filed on Jun. 13, 2018.

(51) Int. Cl.
| | |
|---|---|
| *G01S 7/41* | (2006.01) |
| *G01S 7/03* | (2006.01) |
| *H01Q 1/32* | (2006.01) |
| *H01Q 3/00* | (2006.01) |
| *G06K 9/62* | (2006.01) |
| *G01S 13/58* | (2006.01) |

(52) U.S. Cl.
CPC .............. *G01S 7/417* (2013.01); *G01S 7/032* (2013.01); *H01Q 1/3233* (2013.01); *H01Q 3/00* (2013.01); *G01S 13/584* (2013.01); *G06K 9/6259* (2013.01); *G06K 9/6293* (2013.01)

(58) Field of Classification Search
CPC ........ G01S 7/417; G01S 7/032; G01S 13/931; G01S 13/584
See application file for complete search history.

(56) References Cited

U.S. PATENT DOCUMENTS

| | | | |
|---|---|---|---|
| 9,274,222 B1* | 3/2016 | Schmalenberg | G01S 13/42 |
| 10,218,067 B2* | 2/2019 | Black | H01Q 15/008 |
| 2012/0274524 A1* | 11/2012 | Piazza | H01Q 3/01 343/745 |
| 2016/0011307 A1* | 1/2016 | Casse | B60W 30/14 701/93 |
| 2016/0013531 A1* | 1/2016 | Casse | H01Q 21/065 333/161 |
| 2016/0019458 A1* | 1/2016 | Kaufhold | G01S 13/90 342/25 F |
| 2019/0004535 A1* | 1/2019 | Huang | G05D 1/0251 |

(Continued)

*Primary Examiner* — Peter M Bythrow
(74) *Attorney, Agent, or Firm* — Sandra Lynn Godsey (57) ABSTRACT

Examples disclosed herein relate to an autoencoder assisted radar for target identification. The radar includes an Intelligent Metamaterial ("iMTM") antenna module to radiate a transmission signal with an iMTM antenna structure and generate radar data capturing a surrounding environment, a data pre-processing module having an autoencoder to encode the radar data into an information-dense representation, and an iMTM perception module to detect and identify a target in the surrounding environment based on the information-dense representation and to control the iMTM antenna module. An autoencoder for assisting a radar system and a method for identifying a target with an autoencoder assisted radar in a surrounding environment are also disclosed herein.

20 Claims, 9 Drawing Sheets

(56) References Cited

U.S. PATENT DOCUMENTS

| | | | |
|---|---|---|---|
| 2019/0131721 A1* | 5/2019 | Dani | H01P 1/184 |
| 2019/0139914 A1* | 5/2019 | Kirino | H01P 3/085 |
| 2019/0272620 A1* | 9/2019 | Seip | G06N 3/08 |
| 2019/0353753 A1* | 11/2019 | Gebhardt | G01S 7/417 |
| 2020/0076038 A1* | 3/2020 | Kamo | G01S 13/42 |
| 2021/0063565 A1* | 3/2021 | Sharma | G01S 7/40 |
| 2021/0150197 A1* | 5/2021 | Kokkinos | G06K 9/6215 |

* cited by examiner

AUTOENCODER ASSISTED RADAR FOR TARGET IDENTIFICATION

CROSS-REFERENCE TO RELATED APPLICATIONS

This application claims priority from U.S. Provisional Application No. 62/684,688, filed on Jun. 13, 2018, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence (AI), machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

An autoencoder assisted radar for target identification is disclosed. The radar is suitable for many different applications and can be deployed in a variety of different environments and configurations. In various examples, the radar is used in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on. The radar collects 4D data corresponding to azimuthal angles, elevation angles, range and velocity information. An autoencoder is implemented to reduce the data processing burden, the computational costs and the limited availability of labeled data.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
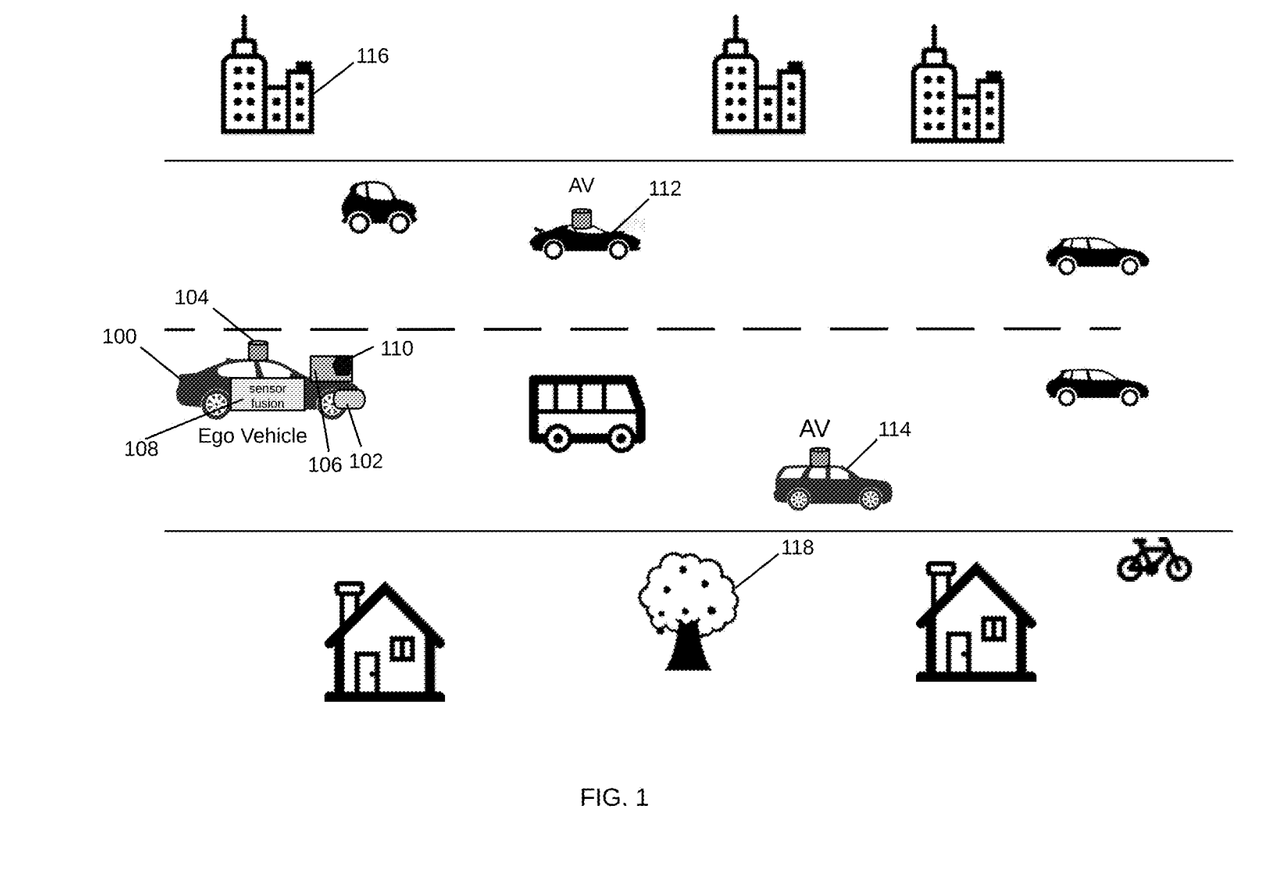
FIG. 1 illustrates an example environment in which an autoencoder assisted radar is used for target identification.

FIG. 1 illustrates an example environment in which an autoencoder assisted radar is used for target identification. Ego vehicle 100 is an autonomous vehicle having multiple perception sensors, including camera 102, lidar 104, and radar 106, among others. In various examples and as described in more detail below, radar 106 is an iMTM radar system capable of providing a 360° true 3D vision and human-like interpretation of the ego vehicle's path and surrounding environment. The iMTM radar system is capable of shaping and steering RF beams in all directions in a 360° field of view ("FoV") and recognize targets quickly and with a high degree of accuracy over a long range of around 300 meters or more. The short range capabilities of camera 102 and lidar 104, and the long range capabilities of radar 106, enable a sensor fusion module 108 in ego vehicle 100 to enhance its target detection and identification.

Target detection and identification is also enhanced with autoencoder 110 in radar system 106. An autoencoder is a feed-forward neural network that learns to compress input data into an information-dense and compact representation that can then be used to reconstruct the input. In the examples described below, the input data are a series of RD maps containing velocity and range information for targets in the path and surrounding environment of ego vehicle 100. Targets may be non-stationary, such as autonomous vehicles 112 and 114, or stationary, such as building 116 and tree 118. As no information needs to be provided on the content of the RD maps, training of the autoencoder 110 is unsupervised.

Figure 2:
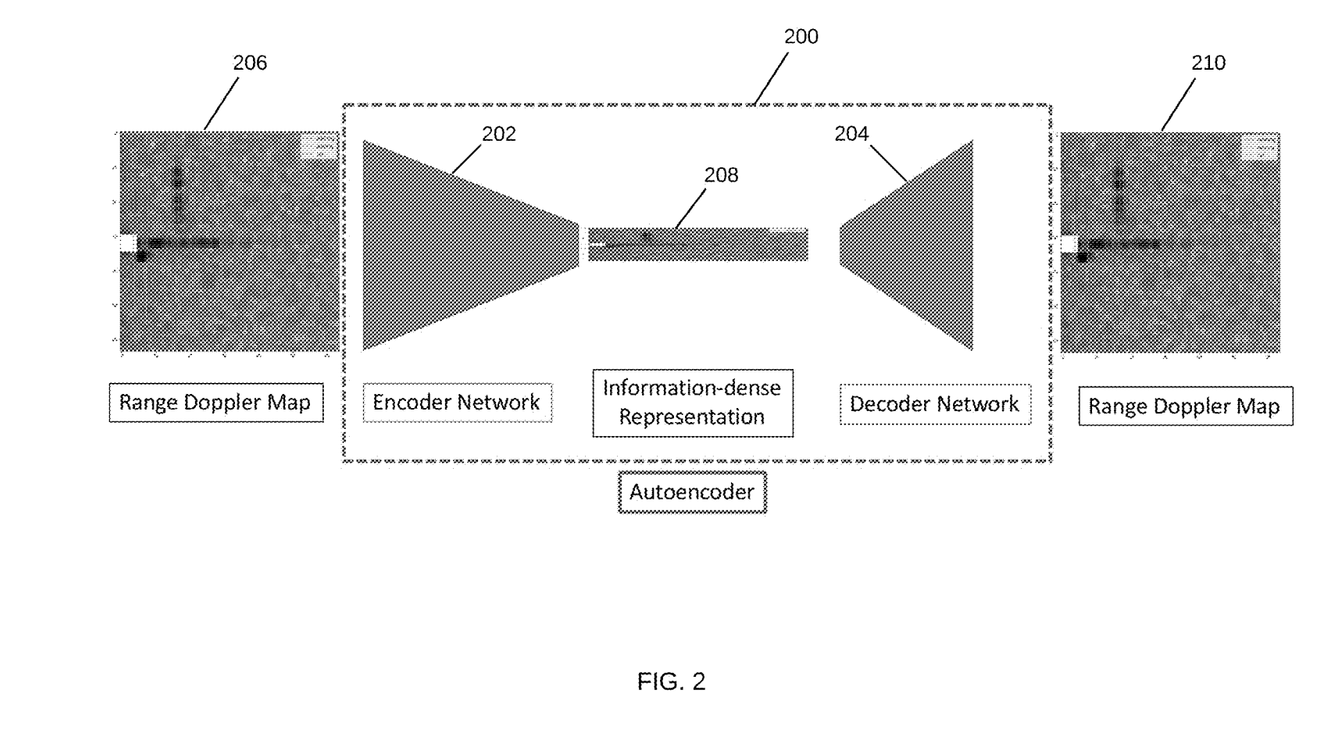
FIG. 2 illustrates a schematic diagram of an autoencoder in accordance with various examples.

FIG. 2 illustrates a schematic diagram of an autoencoder in accordance with various examples. Autoencoder 200, similar to autoencoder 110 of FIG. 1, has an encoder network 202 and a decoder network 204. The encoder network 202 and the decoder network 204 are fully-connected feed-forward neural networks having various layers that are typically mirror images from each other. The depth or number of layers of the encoder and decoder networks 202-204 can be set as desired. The encoder network 202 takes an input 206 and compresses it into an information-dense representation 208. The decoder network 204 uses the compact representation 208 to reconstruct the input 206 into output 210. Note that the goal of the autoencoder 200 is to have output 210 be identical to input 206, subject to a loss function (e.g., mean squared error, cross entropy and so on). Training of the autoencoder is accomplished via backpropagation with raw input data. Note also that the autoencoder 200 is a form of dimensionality reduction, as it is able to compactly represent a 4D radar RD map. As compared other dimensionality reduction techniques, autoencoder 200 is implemented with a fully nonlinear encoder and a convolutional architecture.

Figure 3:
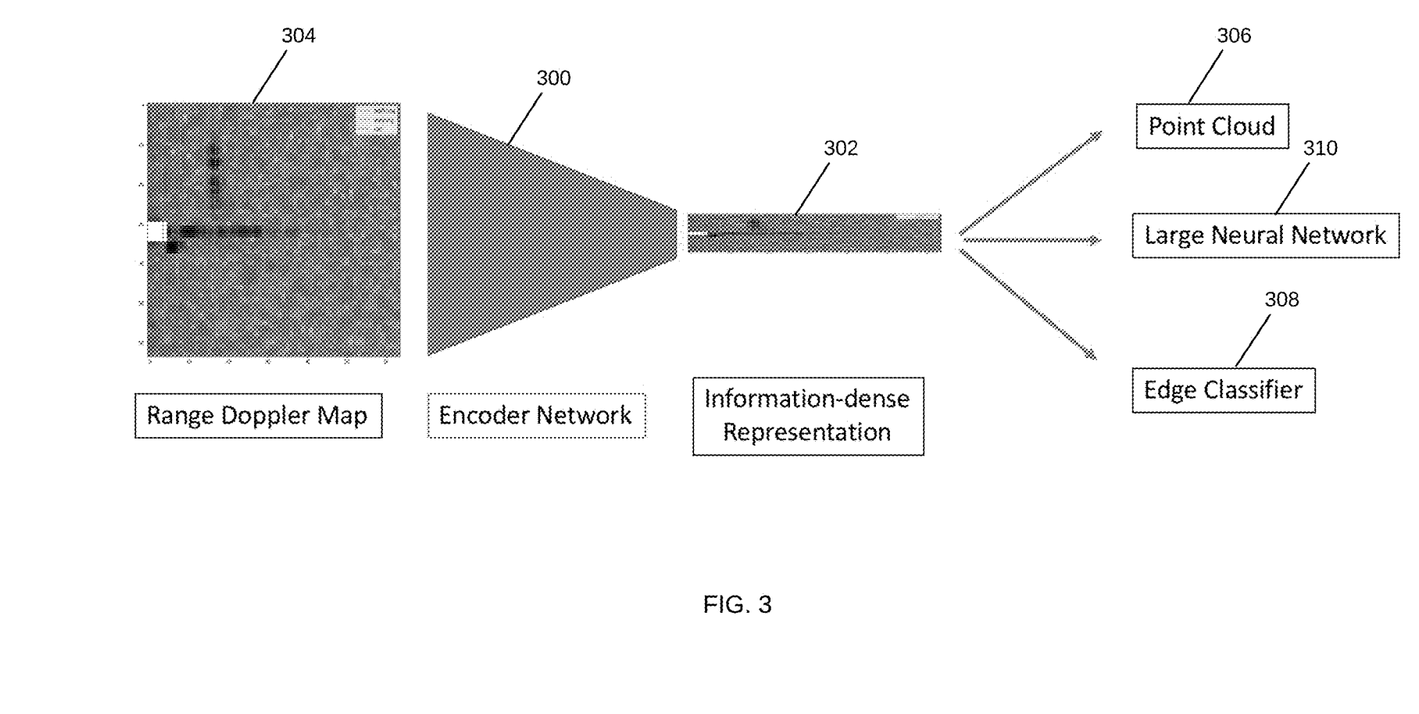
FIG. 3 illustrates example uses of an information-dense representation generated by the autoencoder of FIG. 2.

Attention is now directed to FIG. 3, which illustrates example uses of an information-dense representation generated by the autoencoder of FIG. 2. Encoder network 300 is part of an autoencoder (e.g., autoencoder 200 of FIG. 2) trained to generate an information-dense representation from any RD map, such as information-dense representation 302 generated from RD map 304. With sufficient training, the autoencoder is able to generate information-dense representations that can be used to tackle the challenges of the data processing burden, the computational costs and the limited availability of labeled 4D radar data.

In one example, the information-dense representation 302 can be used to generate a radar point cloud 306 that identifies points of interest. In another example, the information-dense representation 302 can be provided to a small neural network or edge classifier 308 whose task is to identify targets. And in another example, the information-dense representation 302 can be fed to a deep neural network 310 for target detection and identification. RD maps can be aggregated from radar scans across an entire FoV and encoded into information-dense representations as the data comes in (i.e., at the rate at which the radar can collect data). When the neural network 310 is asked to do inference on the entire FoV, much of the processing has already occurred. Note that in the case of generating radar point cloud 306 or edge classifier 308, all this processing can be performed at the edge. Deep neural network 310, due to its computational complexity, can be implemented on a centralized or other such processor.

Figure 4:
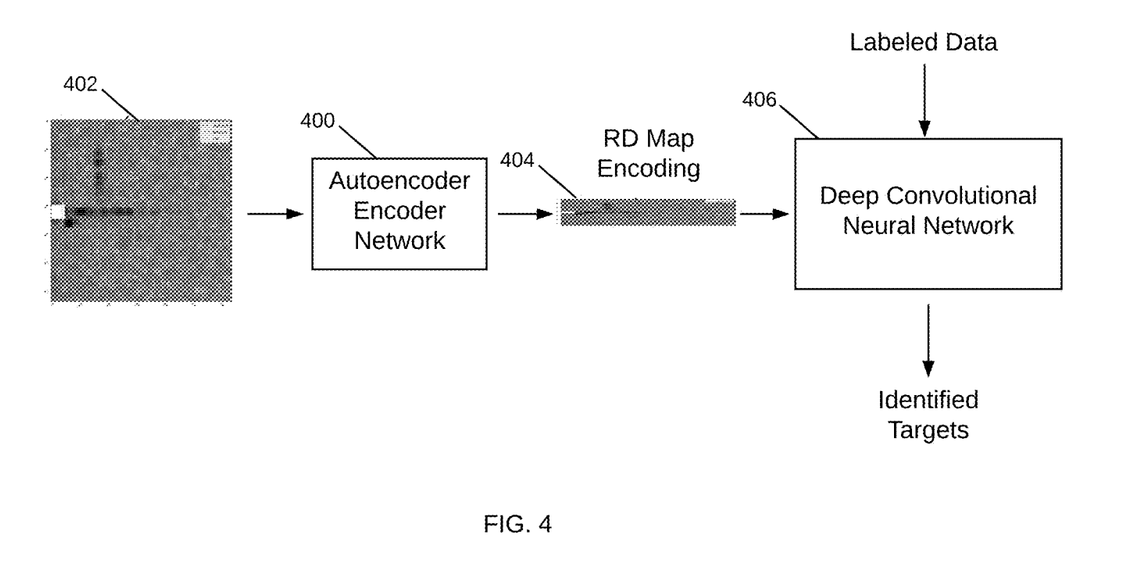
FIG. 4 illustrates a schematic diagram showing an autoencoder being used to train a convolutional neural network for identifying targets in radar Range-Doppler ("RD") maps in accordance with various examples.

FIG. 4 illustrates a schematic diagram showing an autoencoder being used to train a convolutional neural network for identifying targets in radar RD maps in accordance with various examples. Autoencoder 400 has an encoder network to take in RD maps such as RD map 402 and generate a RD map encoding 404 that is an information-dense representation of map 402. The autoencoder 400 is trained on a large set of RD maps. The weights and biases of the trained autoencoder 400 are fed into the deep Convolutional Neural Network ("CNN") 406 for target detection and identification. CNN 406 takes in RD map encoding 404 and provides output data detecting targets, identifying them (e.g., whether a vehicle, pedestrian, cyclist, wall, etc.), their location, velocity, and other identifying information.

In various examples, CNN 406 is a fully convolutional neural network with three stacked convolutional layers from input to output (additional layers may also be included in CNN 406). Each of these layers also performs the rectified linear activation function and batch normalization as a substitute for traditional L2 regularization and includes three filters. The CNN 406 uses small regions of a visual field and identifies edges and orientations in the field, much like a filter for an image. The image goes through a series of convolutional, nonlinear sampling through layers, resulting in a probability. The layers include a convolutional layer that looks at these small regions individually, referred to as receptive fields. The filter process incorporates weights in connections between layers, and when the original information is passed through this layer, the result is a reduced set of data, referred to as a feature map. The feature map identifies objects detected in each receptive field. Note that there may be any number of feature maps as a function of features used in processing. The layers of the CNN 406 detect a first level of features, such as edges. The output of each layer feeds the next layer, which detects a second level of feature, such as a square. At the output of each layer in CNN 406 is a feature map identifying the locations of those features. And as data processes through CNN 406, the layers become more complex to further refine the specific target until the target can be properly identified (e.g., as a pedestrian, cyclist, animal, wall, vehicle, etc.). The final layer of the CNN 406 is a fully connected layer that takes an input feature map and outputs an N-dimensional vector, where N is the number of features or classes. Each number of the N-dimensional vector identifies the probability of each corresponding feature.

It is noted that CNN 406 may incorporate other information to help it identify targets in the vehicle's path and surrounding environment. For example, when a target is moving slowly and outside of a road line, it is likely that the target may be a pedestrian, animal, cyclist, and so on. Similarly, when a target is moving at a high speed, but lower than the average speed of other vehicles on a highway, CNN 406 may use this information to determine if the target is a bus or a truck, which tend in general to move more slowly. The location of a target, such as in the far-right lane of a highway, may also provide an indication as to whether the target may be a slower-moving type of vehicle. If the movement of the target does not follow the path of a road, then the target may be an animal, such as a deer crossing the road. All of this information may be determined from a variety of sensors and other information available to the vehicle, including information provided from weather and traffic services, other vehicles or the environment itself, such as smart roads and smart traffic signals. The sensor fusion module 720 described in more detail below with reference to FIG. 7 analyzes all the information available from the sensors to more accurately detect and identify each target.

The operational accuracy of the CNN 406 is determined by several factors, and one is the training process that provides feedback to the network to adjust its weights; this process is called backpropagation. The CNN 406 trains on labeled data 408, which are known sets of input-to-output data. For example, an input may be the camera data received from a camera sensor at time t1. The known input-output dataset is selected as either raw data or may be synthetic data; the data is digitized, and specific parameters extracted. The data may also be compressed or pre-processed. Either way, there is a set of labeled input data received from a sensor. The CNN 406 does a forward pass through each one of its layers, computing each layer output based on the weights in the layer, and passing the output to the next layer. The output data of CNN 406 is then what information you would like the CNN 406 to provide you when it receives this set of sensor data, i.e., the output of CNN 406 will be in the same form as the known output of the selected data. Its value, however, may differ from the known output. The next step is to compare the output of CNN 406 with the known, expected output from the selected dataset. This can be implemented in a number of ways, such as by Euclidean distance, cross entropy, weighted cross entropy, and other such measures.

A score is determined as an indication of how close the output of CNN 406 matches the expected output. The training iterates until the scores indicate that the CNN 406 is trained, that is, until an error tolerance for the scores is small enough and the outputs of CNN 406 given the known inputs are within a desired tolerance from the known outputs. If they are not, then the score is sent back to the CNN 406 to adjust its weights and the training continues to iterate. Training of CNN 406 is an iterative process, which terminates when the output of the network is sufficient1y close to the desired results. There are a variety of methods to adjust the weights in the CNN 406. The goal is to have a CNN 406 that can receive any sensor information (e.g., RD map encoding 404) and predict the targets and environment as closely as possible.

Figure 5:
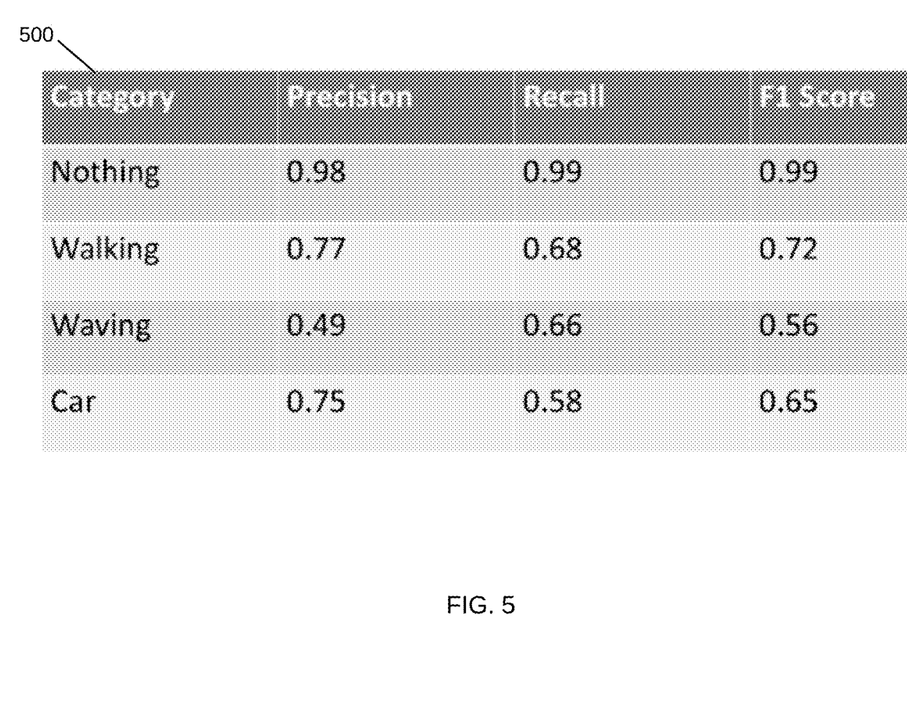
FIG. 5 illustrates performance results for the convolutional neural network of FIG. 4.

Note that with its weights and biases provided by the autoencoder 400, training of the CNN 406 is made much faster and less processing intensive than if it did not have access to these initial weights and biases. The autoencoder 400 also results in improved performance results: on an example labeled data set used for training, CNN 406 is able to identify multiple classes of targets simultaneously as well as provide the ranges at which those targets were present. The performance of the CNN 406 is illustrated in table 500 FIG. 5.

In various examples, CNN 406 can also work together with a Decision Neural Network ("DNN"), such as a Q-learning network that receives the output data from CNN 406 and determines an action for radar to perform. The action may be to steer RF beams to a given direction in the FoV or to change beam parameters. In order to select the best action, the DNN is trained based on reinforcement learning, a machine learning technique inspired by behavioral psychology. The idea is to have the DNN choose an action for a given state such that its reward is maximized. In this case, the state is the output of the CNN, the action is a selection of beam parameters for the radar to know where to direct its next beams with the selected parameters (e.g., beam width, direction, etc.), and the reward is the performance of the DNN following the selections. Training the DNN boils down to indicating to the DNN when it is doing well and when it is doing poorly. For example, reinforcement learning is used to train dogs. You cannot tell the dog what to do, but over time the dog will understand that certain actions lead to more rewards. The rewards are also not the same; some rewards may be more likely or desirable than others. The goal of DNN is then to maximize its expected future reward of an action given a state. Training of DNN is accomplished by teaching the DNN to have the optimal representation of the space of states, actions, and rewards.

Figure 6:
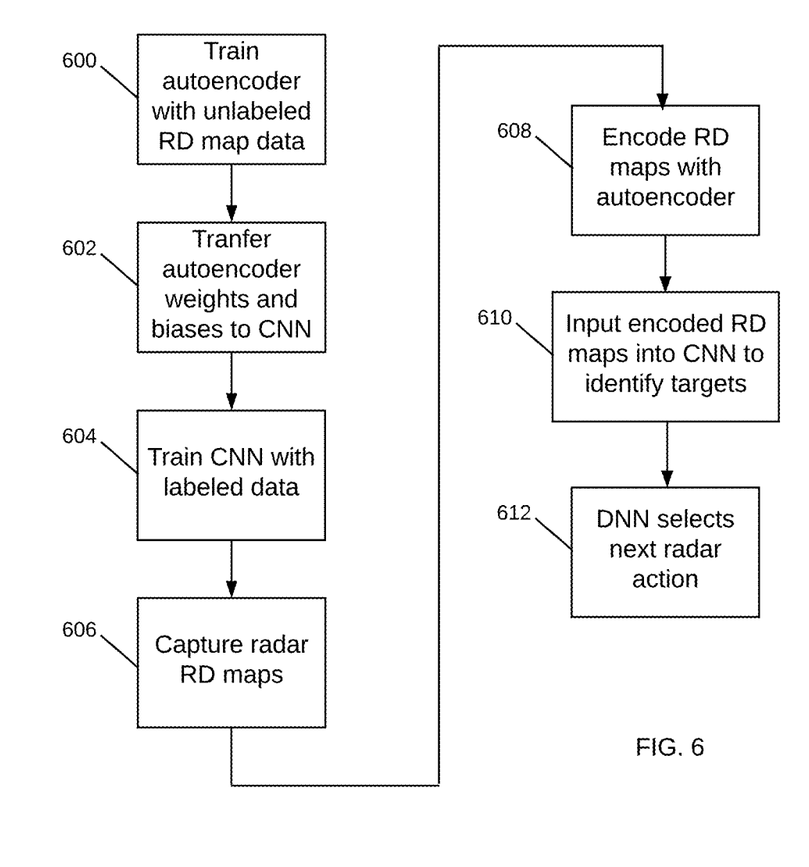
FIG. 6 is a flowchart for using an autoencoder assisted radar for target identification in accordance with various examples.

Attention is now directed to FIG. 6, which is a flowchart for using an autoencoder assisted radar for target identification in accordance with various examples. First, the autoencoder is trained with a large data set of unlabeled radar RD maps (600). Once the autoencoder is trained satisfactorily, its weights and biases are used to initialize the CNN (602). The CNN is trained with labeled data, such as labeled RD maps or other radar, lidar, and camera data (604). Once the networks are trained, the radar is put into operation to capture radar data including RD maps (606). The captured RD maps are encoded with the autoencoder to generate information-dense representations (608). Note that step 608 can be performed on the edge and that multiple captured RD maps can be aggregated from radar scans across the entire FoV of the vehicle. The encoded RD maps are then input into the CNN to identify targets (610). A DNN selects a next action for the radar to perform based on the results of the CNN (612). The action may be to steer the next radar beams to the same or different direction.

Figure 7:
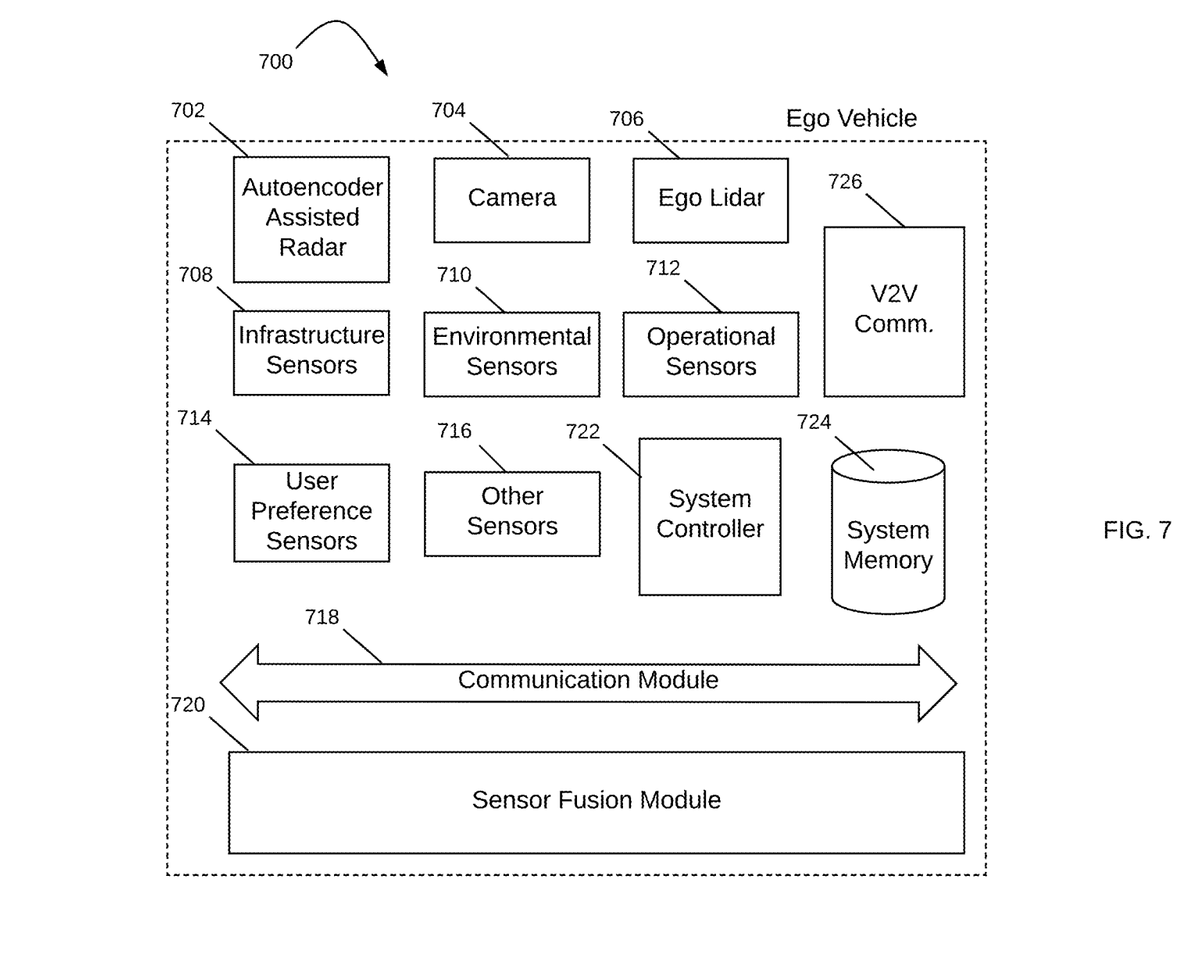
FIG. 7 is a schematic diagram showing an autoencoder assisted radar in an autonomous driving system for an ego vehicle in accordance with various examples.

FIG. 7 illustrates the autoencoder assisted radar in an autonomous driving system 700 for an ego vehicle. Not all of the depicted components may be used, however, and one or more implementations may include additional components not shown in the figure. Variations in the arrangement and type of the components may be made without departing from the scope of the claims set forth herein. Additional components, different components, or fewer components may be provided.

Autonomous driving system 700 is a system for use in an ego vehicle that provides partial or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 700 includes an autoencoder assisted radar 702 and other sensor systems such as camera 704, lidar 706, infrastructure sensors 708, environmental sensors 710, operational sensors 712, user preference sensors 714, and other sensors 716. Autonomous driving system 700 also includes a communications module 718, a sensor fusion module 720, a system controller 722, a system memory 724, and a V2V communications module 726. It is appreciated that this configuration of autonomous driving system 700 is an example configuration and not meant to be limiting to the specific structure illustrated in FIG. 7. Additional systems and modules not shown in FIG. 7 may be included in autonomous driving system 700.

Autoencoder assisted radar 702 includes an iMTM antenna module (described in more detail below with reference to FIGS. 8-9) for providing dynamically controllable and steerable beams that can focus on one or multiple portions of a 360° FoV of the vehicle. The beams radiated from the iMTM antenna module are reflected back from targets in the vehicle's path and surrounding environment and received and processed by the autoencoder assisted radar 702 to detect and identify the targets. The autoencoder assisted radar 702 also has an iMTM perception module that is trained to detect and identify targets and control the iMTM antenna module as desired. Camera sensor 704 and ego lidar 706 are also used to detect targets in the path and surrounding environment of the ego vehicle, albeit in a much lower range. A beacon system 728 is embedded in the ego iMTM radar 702 for broadcasting vehicle identification or other information to other vehicles.

Infrastructure sensors 708 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 710 detect various conditions outside, such as temperature, humidity, fog, visibility, precipitation, and so forth. Operational sensors 712 provide information about the functional operation of the vehicle. This may be battery charge level, tire pressure, fuel levels, brake wear, and so forth. The user preference sensors 714 may be configured to detect conditions that are part of a user preference. This may be temperature adjustments, smart window shading, and so forth. Other sensors 716 may include additional sensors for monitoring conditions in and around the vehicle.

In various examples, the sensor fusion module 720 optimizes these various functions to provide an approximately comprehensive view of the vehicle and environments. Many types of sensors may be controlled by the sensor fusion module 720. These sensors may coordinate with each other to share information and consider the impact of one control action on another system. In one example, in a congested driving condition, a noise detection module (not shown) may identify that there are multiple radar signals that may interfere with the vehicle. This information may be used by an iMTM perception module in autonomous driving system 700 to adjust the beam size of the iMTM antenna module to avoid these other signals and minimize interference.

In another example, environmental sensor 710 may detect that the weather is changing, and visibility is decreasing. In this situation, the sensor fusion module 720 may determine to configure the other sensors to improve the ability of the vehicle to navigate in these new weather conditions. The configuration may include turning off one or more sensors, such as camera 704 and/or lidar 706 or reducing the sampling rate of these visibility-based sensors. This effectively places reliance on the sensor(s) adapted for the current situation. In response, the iMTM perception module configures the autoencoder assisted radar 702 for these conditions as well. For example, the autoencoder assisted radar 702 may reduce the beam width to provide a more focused beam, and thus a finer sensing capability.

In various examples, the sensor fusion module 720 may send a direct control signal to the iMTM antenna module based on historical conditions and controls. The sensor fusion module 720 may also use some of the sensors within autonomous driving system 700 to act as feedback or calibration for the other sensors. In this way, an operational sensor 712 may provide feedback to the iMTM perception module and/or the sensor fusion module 720 to create templates, patterns and control scenarios. These are based on successful actions or may be based on poor results, where the sensor fusion module 720 learns from past actions.

Data from sensors 702-716 may be combined in sensor fusion module 720 to form fused sensor data that improves the target detection and identification performance of autonomous driving system 700. Sensor fusion module 720 may itself be controlled by system controller 722, which may also interact with and control other modules and systems in the vehicle. For example, system controller 722 may turn on and off the different sensors 702-716 as desired, or provide instructions to the vehicle to reduce velocity or stop upon identifying a driving hazard (e.g., deer, pedestrian, cyclist, or another vehicle suddenly appearing in the vehicle's path, flying debris, etc.)

All modules and systems in autonomous driving system 700 communicate with each other through communication module 718. Autonomous driving system 700 also includes system memory 724, which may store information and data (e.g., static and dynamic data) used for operation of autonomous driving system 700 and the ego vehicle using autonomous driving system 700. V2V communications module 726 is used for communication with other vehicles. The V2V communications may also include information from other vehicles that is invisible to the user, driver, or rider of the vehicle, and may help vehicles coordinate to avoid an accident. In various examples, the beacon system 728 can be a part of the V2V communications module 726.

Figure 8:
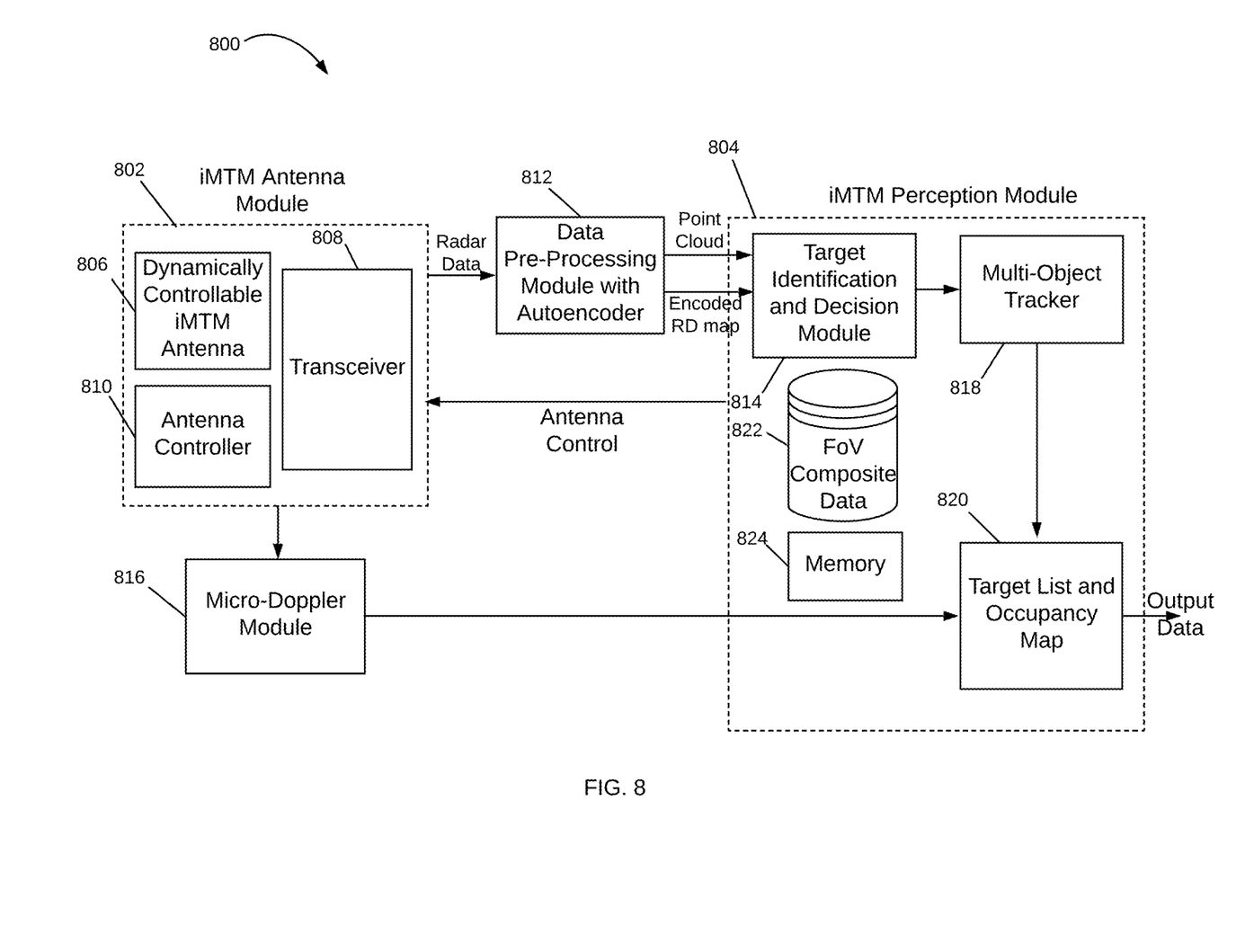
FIG. 8 is a schematic diagram of an autoencoder assisted radar for use in an ego vehicle in accordance with various examples.

FIG. 8 illustrates a schematic diagram of an autoencoder assisted radar system 800 for use in the ego vehicle in accordance with various examples. The autoencoder assisted radar system 800 is a "digital eye" with true 3D vision and capable of a human-like interpretation of the world. The "digital eye" and human-like interpretation capabilities are provided by two main modules: iMTM Antenna Module 802 and iMTM Perception Module 804. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 802 includes a Dynamically Controllable iMTM ("DCiMTM") antenna 806, a transceiver module 808 and an antenna controller 810. The DCiMTM antenna 806 can radiate dynamically controllable and highly-directive RF beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 808 is coupled to the DCiMTM antenna 806, and prepares a signal for transmission through a transmitter portion of the transceiver module 808. In some examples, the prepared signal is a sweep signal for a radar device. In some aspects, the sweep signal is defined by modulation and frequency. In various examples, the beacon circuit 300 for superimposing a baseband beacon signal to a radar transmission signal may be included in or coupled to the transceiver module 808. The sweep signal is provided to the DCiMTM antenna 806 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 810, such as at the direction of iMTM perception module 804.

The RF beams reflect from targets in the ego vehicle's path and surrounding environment and the RF beam reflections are received by a receiver portion of the transceiver module 808 through the DCiMTM antenna 806. The receiver portion may acquire the PN code chip timing, including the frequency and phase. At first, the receiver portion can detect one or more signal peaks in the received RF signal by correlating a local reference PN code with the received RF signal at different phases. In some aspects, the received RF signal may originate from several vehicles transmitting the same ZC code. In this respect, multiple signal peaks can be present at the output of the correlator, where each signal peak corresponds to a respective vehicle. In cases where a unified and synchronized timing reference is present in all the vehicles, the receiving procedure with respect to each of the vehicles can determine the relative distances mutually and precisely.

In one or more implementations, the receiver portion of the transceiver module 808 can write the receiver correlation data, as detected with the signal peaks present at the output of the correlator, into non-permanent storage, such as volatile memory. In this respect, a further stage of processing can be performed by the data pre-processing module 812 to identify the vehicle identification information, together with other information data carried with these signals transmitted from different vehicles present in the field.

In one or more implementations, following the RF operations such as receiving, including down-conversion and filtering in the iMTM antenna module 802, baseband signals are then converted to digital domain through analog-to-digital converters in the iMTM antenna module 802 for data (e.g., objects) detection by the iMTM perception module 804. For example, radar data from the received RF beams is provided to the iMTM perception module 804 for target detection and identification. In some implementations, a data pre-processing module 812, coupled between the iMTM antenna module 802 and the iMTM perception module 804, can process the radar data to encode it into a point cloud for use by the iMTM perception module 804. The data pre-processing module 812 includes an autoencoder for encoding the radar data into an information-dense RD map representation. In various examples, the data pre-processing module 812 can be a part of the iMTM antenna module 802 or the iMTM perception module 804, such as on the same circuit board as the other modules within the iMTM antenna module 802 or iMTM perception module 804. Also, in various examples, the data encoding may use the lidar point cloud from the ego lidar to perform NLOS correction in the radar data.

The radar data may be organized in sets of RD map information, corresponding to 8D information that is determined by each RF beam radiated off of targets, such as azimuthal angles, elevation angles, range, and velocity. The RD maps may be extracted from FMCW radar pulses and contain both noise and systematic artifacts from Fourier analysis of the pulses. The iMTM perception module 804 controls further operation of the iMTM antenna module 802 by, for example, providing an antenna control signal containing beam parameters for the next RF beams to be radiated from the iMTM cells in the DCiMTM antenna 806.

In operation, the antenna controller 810 is responsible for directing the DCiMTM antenna 806 to generate RF beams with determined parameters such as beam width, transmit angle, and so on. The antenna controller 810 may, for example, determine the parameters at the direction of iMTM perception module 804, which may at any given time determine to focus on a specific area of an FoV upon identifying targets of interest in the ego vehicle's path or surrounding environment. The antenna controller 810 determines the direction, power, and other parameters of the RF beams and controls the DCiMTM antenna 806 to achieve beam steering in various directions. The antenna controller 810 also determines a voltage matrix to apply to reactance control mechanisms coupled to the DCiMTM antenna 806 to achieve a given phase shift. In some examples, the DCiMTM antenna 806 is adapted to transmit a directional beam through active control of the reactance parameters of the individual iMTM cells that make up the DCiMTM antenna 806. The iMTM perception module 804 provides control actions to the antenna controller 810 at the direction of the Target Identification and Decision Module 814.

Next, the DCiMTM antenna 806 radiates RF beams having the determined parameters. The RF beams are reflected from targets in and around the ego vehicle's path (e.g., in a 360° field of view) and are received by the transceiver module 808 in iMTM antenna module 802. The iMTM antenna module 802 transmits the received 8D radar data to the data pre-processing module 812 for generating a point cloud that is then sent to the target identification and decision module 814 of the iMTM perception module 804. A micro-doppler module 816 coupled to the iMTM antenna module 802 and the iMTM perception module 804 extracts micro-doppler signals from the 8D radar data to aid in the identification of targets by the iMTM perception module 804. The micro-doppler module 816 takes a series of RD maps from the iMTM antenna module 802 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the iMTM perception module 804 can determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 816 can be a part of the iMTM antenna module 802 or the iMTM perception module 804, such as on the same circuit board as the other modules within the iMTM antenna module 802 or iMTM perception module 804.

The target identification and decision module 814 receives the point cloud from the data pre-processing module 812, processes the point cloud to detect and identify targets with a Convolutional Neural Network (CNN), and determines with a Deep Neural Network (DNN) the control actions to be performed by the iMTM antenna module 802 based on the detection and identification of such targets. For example, the target identification and decision module 814 may detect a cyclist on the path of the ego vehicle and direct the iMTM antenna module 802, at the instruction of its antenna controller 810, to focus additional RF beams at a given phase shift and direction within the portion of the FoV corresponding to the cyclist's location.

The iMTM perception module 804 may also include a multi-object tracker 818 to track the identified targets over time, such as, for example, with the use of a Kalman filter. The multi-object tracker 818 matches candidate targets identified by the target identification and decision module 814 with targets it has detected in previous time windows. By combining information from previous measurements, expected measurement uncertainties, and some physical knowledge, the multi-object tracker 818 generates robust, accurate estimates of target locations.

Information on identified targets over time are then stored at a target list and occupancy map 820, which keeps tracks of targets' locations and their movement over time as determined by the multi-object tracker 818. The tracking information provided by the multi-object tracker 818 and the micro-doppler signal provided by the micro-doppler module 816 are combined at the target list and occupancy map 820 to produce an output containing the type/class of target identified, their location, their velocity, and so on. This information from autoencoder assisted radar system 800 is then sent to a sensor fusion module (e.g., sensor fusion module 220 in the ego vehicle), where it is processed together with information from other sensors in the ego vehicle.

In various examples, the iMTM perception module 804 includes an FoV composite data unit 822, which stores information that describes an FoV. This information may be historical data used to track trends and anticipate behaviors and traffic conditions or may be instantaneous or real-time data that describes the FoV at a moment in time or over a window in time. The ability to store this data enables the iMTM perception module 804 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the iMTM perception module 804 may determine to narrow the beam width for a more focused view of that sector or area in the FoV. The next scan may indicate the targets' length or other dimension, and if the target is a vehicle, the iMTM perception module 804 may consider what direction the target is moving and focus the beams on that area. Similarly, the echo may be from a spurious target, such as a bird, which is small and moving quickly out of the path of the vehicle. There are a variety of other uses for the FoV composite data 822, including the ability to identify a specific type of target based on previous detection. The iMTM perception module 804 also includes a memory 824 that stores useful data for autoencoder assisted radar system 800, such as, for example, information on which subarrays of the DCiMTM antenna 806 perform better under different conditions.

In various examples described herein, the use of autoencoder assisted radar system 800 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 80 km/h when visibility is poor. Using the autoencoder assisted radar system 800, the driver (or driverless vehicle) may maintain the maximum safe speed without regard to the weather conditions. Even if other drivers slow down, a vehicle enabled with the autoencoder assisted radar system 800 can detect those slow-moving vehicles and obstacles in the path of the vehicle and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the iMTM perception module 804 adjusts the focus of the RF beam to a larger beam width, thereby enabling a faster scan of areas where there are few echoes. The iMTM perception module 804 may detect this situation by evaluating the number of echoes received within a given time period and making beam size adjustments accordingly. Once a target is detected, the iMTM perception module 804 determines how to adjust the beam focus. This is achieved by changing the specific configurations and conditions of the DCiMTM antenna 806. In one example scenario, the voltages on the varactors are adjusted. In another example scenario, a subset of iMTM unit cells is configured as a subarray. This configuration means that this set may be treated as a single unit, and all the varactors are adjusted similarly. In another scenario, the subarray is changed to include a different number of unit cells, where the combination of iMTM unit cells in a subarray may be changed dynamically to adjust to conditions and operation of the autoencoder assisted radar system 800.

All of these detection scenarios, analysis and reactions may be stored in the iMTM perception module 804, such as in the memory 824, and used for later analysis or simplified reactions. For example, if there is an increase in the echoes received at a given time of day or on a specific highway, that information is fed into the antenna controller 810 to assist in proactive preparation and configuration of the DCiMTM antenna 806. Additionally, there may be some subarray combinations that perform better, such as to achieve a desired result, and this is stored in the memory 824.

Figure 9:
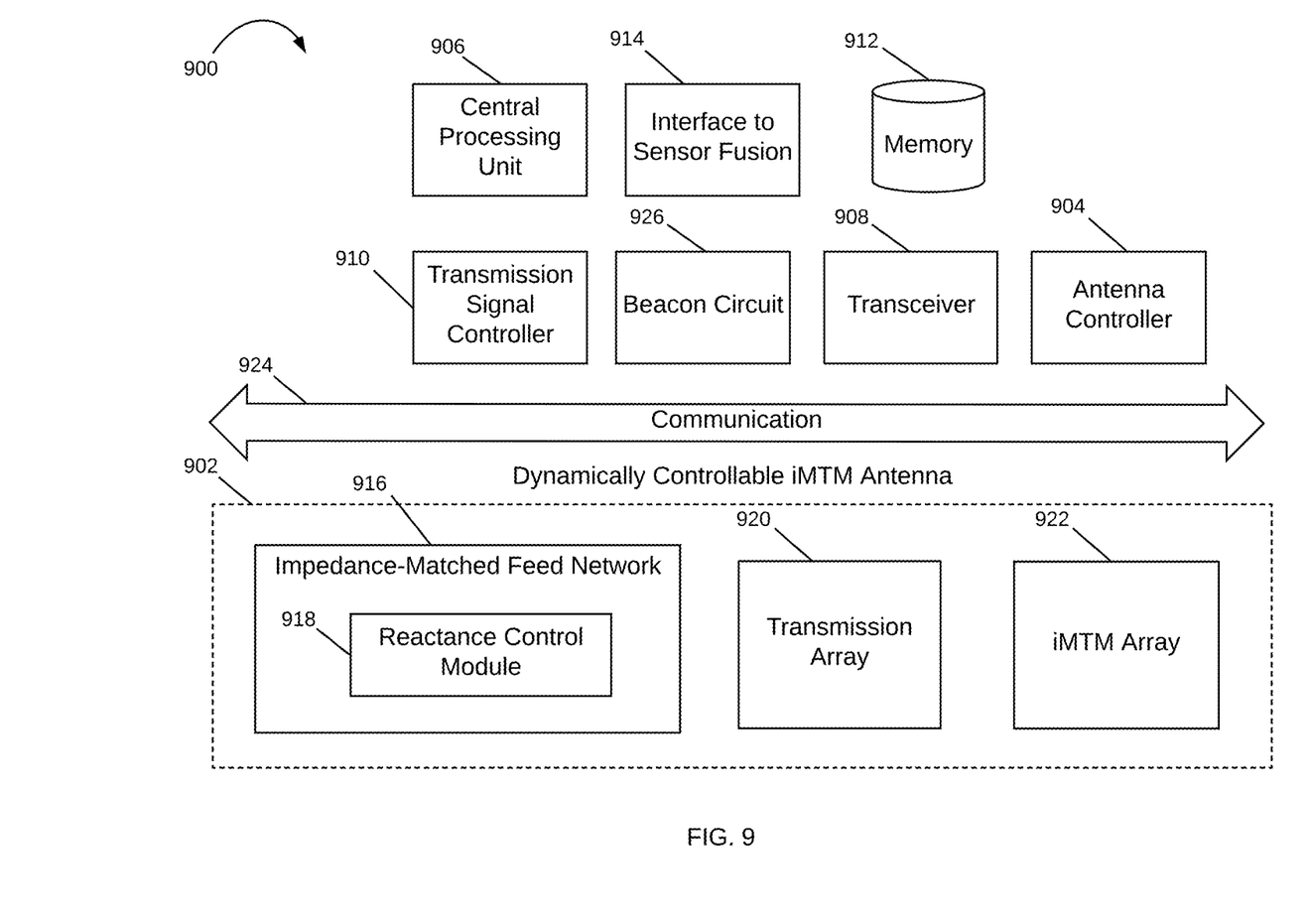
FIG. 9 is a schematic diagram of an Intelligent Metamaterial ("iMTM") antenna module for use with the autoencoder assisted radar of FIG. 8 in accordance with various examples.

Attention is now directed to FIG. 9, which illustrates a schematic diagram of an iMTM antenna module 900 for use with the autoencoder assisted radar system 800 of FIG. 8 in accordance with various examples. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 900 has an DCiMTM antenna 902 coupled to an antenna controller 904, a central processor 906, and a transceiver 908. A transmission signal controller 910 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 910 may also generate a cellular modulated signal, such as an Orthogonal Frequency Division Multiplexed ("OFDM") signal. In some examples, the signal is provided to the iMTM antenna module 900 and the transmission signal controller 910 may act as an interface, translator or modulation controller, or otherwise as required for the signal to propagate through a transmission line system. The received information is stored in a memory storage unit 912, wherein the information structure may be determined by the type of transmission and modulation pattern.

The DCiMTM antenna 902 includes a transmission array 920 and iMTM array 922. In operation, the DCiMTM antenna 902 radiates the signal to a radiating array of iMTM cells in the iMTM array 922. In various examples, the DCiMTM antenna 902 includes an impedance-matched feed network 916, having a reactance control module 918. The reactance control module 918 includes a reactance control mechanism controlled by antenna controller 904, which may be used to control the phase of a radiating signal from radiating array structures, such as iMTM array 922.

Note that as illustrated in FIG. 9, there is one DCiMTM antenna 902 in iMTM antenna module 900. However, an iMTM antenna module 900 may have multiple DCiMTM antennas in any given configuration. A set of DCiMTM antennas may be designated as transmit antennas, and another set may be designated as receive antennas. Further, a DCiMTM antenna may be orthogonal from another. Different DCiMTM antennas may also have different polarizations. In various examples, different DCiMTM antennas may be configured to detect different targets, e.g., a set of antennas may be configured to enhance the detection and identification of pedestrians, another set of antennas may be configured to enhance the detection and identification of vehicles, and so forth. In the case of pedestrians, the configuration of the antennas may include power amplifiers to adjust the power of a transmitted signal and/or different polarization modes for different arrays to enhance pedestrian detection. It is appreciated that numerous configurations of DCiMTM antennas may be implemented in a given iMTM antenna module.

In operation, the antenna controller 904 receives information from other modules in iMTM antenna module 900 and/or from iMTM perception module 804 in FIG. 8 indicating a next radiation beam, in which a radiation beam may be specified by parameters such as beam width, transmit angle, transmit direction and so forth. The antenna controller 904 determines a voltage matrix to apply to the reactance control module 918 in DCiMTM antenna 902 to achieve a given phase shift or other parameters. In these examples, the DCiMTM antenna 902 is adapted to transmit a directional beam without using digital beam forming methods, but rather through active control of the reactance parameters of the individual iMTM cells that make up the iMTM array 922.

Transceiver 908 prepares a signal for transmission, such as a signal for a radar device, in which the signal is defined by modulation and frequency. The signal is received by the DCiMTM antenna 902 and the phase of the iMTM cells in the iMTM array 922 is adjusted at the direction of the antenna controller 904. In some examples, transmission signals are received by a portion, or subarray(s), of the iMTM array 922. The iMTM array 922 can be implemented in many applications, including radar, cellular antennas, and autonomous vehicles to detect and identify targets in the path of or surrounding the vehicle. Alternate examples may use the iMTM array 922 for wireless communications, medical equipment, sensing, monitoring, and so forth. Each application type incorporates designs and configurations of the elements, structures and modules described herein to accommodate their needs and goals.

In iMTM antenna module 900, a signal is specified by antenna controller 904, which may be at the direction of an iMTM perception module (e.g., iMTM perception module 804 in FIG. 8), a sensor fusion module (e.g., sensor fusion module 720 in FIG. 7) via interface to sensor fusion 914, or it may be based on program information from memory storage unit 912. There are a variety of considerations to determine the beam formation, in which this information is provided to antenna controller 904 to configure the various elements of the iMTM array 922, which are described herein. The transmission signal controller 910 can generate the radar transmission signal and provides it to beacon circuit 926. Alternatively, the beacon circuit 926 may be incorporated in the transceiver module 908. The beacon circuit (whether as a separate module 926 or in transceiver 908) generates a beacon signal frame (that includes a beacon signal superimposed to a radar signal) for DCiMTM antenna 902, such as through a coaxial cable or other connector. The beacon signal frame propagates through the impedance-matched feed network 916 to the transmission array 920 and iMTM array 922 for transmission through the air.

The impedance-matched feed network 916 includes impedance matching mechanisms and a reactance control module 918 for respectively matching input signal parameters with the iMTM cells in iMTM array 922 and providing phase shift control to each cell. The impedance matching mechanisms may include a directional coupler having an input port to each of adjacent transmission lines in the impedance-matched feed network 916. The adjacent transmission lines in impedance-matched feed network 916 may form a super element, in which an adjacent transmission line pair has a specific phase difference, such as a 90° phase difference with respect to each other.

The impedance matching mechanisms work in coordination with the reactance control module 918 to provide phase shifting of the radiating signal(s) from the iMTM array 922. In various examples, the reactance control module 918 includes a reactance control mechanism controlled by antenna controller 904, which may be used to control the phase of a radiating signal from the iMTM cells in the iMTM array 922 and to adjust the effective reactance of a transmission line and/or a cell fed by a transmission line in the impedance-matched feed network 916. The reactance control module 918 may, for example, include a varactor, a varactor network, a phase shift network, or any other mechanism capable of providing a desired phase shift up to 360° in each iMTM cell. The phase shift network system may include multiple varactors to achieve the desired phase shift.

One or more reactance control mechanisms may be placed within a transmission line in the impedance-matched feed network 916. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism. Further, the reactance control module 918 may be positioned within the architecture of impedance-matched feed network 916; one or both may be external to the impedance-matched feed network 916 for manufacture or composition as an antenna or radar module.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance.

The autoencoder assisted radar may implement the various aspects, configurations, processes and modules described throughout this description. The autoencoder assisted radar is configured for placement in an autonomous driving system (e.g., autonomous driving system 700 of FIG. 7) or in another structure in an environment (e.g., buildings, bill boards along roads, road signs, traffic lights, etc.) to complement and supplement information of individual vehicles, devices and so forth. The autoencoder assisted radar scans the environment, and may incorporate infrastructure information and data, to alert drivers and vehicles as to conditions in their path or surrounding environment. The autoencoder assisted radar is also able to identify targets and actions within the environment. The various examples described herein support autonomous driving with improved sensor performance, all-weather/all-condition detection, advanced decision-making algorithms and interaction with other sensors through sensor fusion. The autoencoder assisted radar leverages intelligent metamaterial antenna structures and AI techniques to create a truly intelligent digital eye for autonomous vehicles.

Further, the use of an autoencoder addresses the challenges of the data processing burden, the computational costs and the limited availability of labeled 4D radar data. The autoencoder maps a full RD map onto an information-dense representation that takes strictly less memory. While the amount of compression may depend on the specifics of the implementation, it is expected that the data burden on subsequent CNN, DNN and other processing networks and algorithms will also be reduced. Because the autoencoder is able to process radar data as it comes in and store the results of this preprocessing, much of the computation can be performed at the edge. This is expected to reduce the burden on a centralized processor, or even eliminate it. Also, as the autoencoder is trained on a large set of unlabeled data, the need for labeled data for training the CNN is reduced and the CNN is more robust and accurate with the weights and biases used from the trained autoencoder.

It is appreciated that the previous description of the disclosed examples is provided to enable any person skilled in the art to make or use the present disclosure. Various modifications to these examples can be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An autoencoder assisted radar for target identification, comprising:
    an Intelligent Metamaterial ("iMTM") antenna module configured to radiate a transmission signal with an iMTM antenna structure and generate radar data capturing a surrounding environment;
    a data pre-processing module having an autoencoder configured to encode the radar data into an information-dense representation; and
    an iMTM perception module configured to detect and identify a target in the surrounding environment based on the information-dense representation and to control the iMTM antenna module.

2. The autoencoder assisted radar of claim 1, wherein the autoencoder includes an encoder network and a decoder network, and wherein the encoder network includes a feed-forward neural network that learns to compress input data into the information-dense representation that is used to reconstruct the input by the decoder network.

3. The autoencoder assisted radar of claim 2, wherein:
    the encoder network is configured to receive the radar data and compress the radar data into the information-dense representation, and
    the decoder network is configured to obtain the information-dense representation and reconstruct the radar data into an output that represents a multi-dimensional radar Range-Doppler ("RD") map from the information-dense representation.

4. The autoencoder assisted radar of claim 1, wherein the autoencoder is trained via backpropagation with raw input radar data.

5. The autoencoder assisted radar of claim 4, wherein weights and biases of the trained autoencoder are fed into a convolutional neural network for target detection and identification.

6. The autoencoder assisted radar of claim 5, wherein the convolutional neural network obtains RD map encoding data and provides output data indicating identifying information about a detected target, wherein the identifying information includes one or more of a type of the target, a location of the target, or a velocity of the target.

7. The autoencoder assisted radar of claim 6, wherein the iMTM perception module comprises a deep neural network configured to select a next radar action based at least on the output data from the convolutional neural network.

8. The autoencoder assisted radar of claim 1, wherein the iMTM perception module is further configured to provide the information-dense representation to one or more neural networks to classify one or more objects for target detection and identification.

9. The autoencoder assisted radar of claim 1, wherein the data pre-processing module is further configured to aggregate a plurality of RD maps in the radar data from radar scans across a field of view at a rate at which the iMTM antenna module generates the radar data.

10. An autoencoder for assisting a radar system, comprising:
   an encoder network configured to receive an input and compress the input into an information-dense representation; and
   a decoder network configured to obtain the information-dense representation and reconstruct the input into an output that represents a multi-dimensional radar Range-Doppler ("RD") map from the information-dense representation.

11. The autoencoder of claim 10, wherein the encoder network and the decoder network are fully-connected feed-forward neural networks having a plurality of layers that are substantially mirror images from each other.

12. The autoencoder of claim 10, wherein the plurality of layers of the encoder network and decoder network is programmable to a predetermined number of layers.

13. The autoencoder of claim 10, wherein the encoder network is trained to generate the information-dense representation from one or more RD maps.

14. The autoencoder of claim 13, wherein weights and biases of the trained encoder network are fed into a deep convolutional neural network for target detection and identification.

15. The autoencoder of claim 10, wherein the decoder network generates a radar point cloud that identifies one or more points of interest from the information-dense representation.

16. A method for identifying a target with an autoencoder assisted radar in a surrounding environment, the method comprising:
   directing an Intelligent Metamaterial ("iMTM") antenna structure to radiate Radio Frequency ("RF") beams with determined parameters;
   receiving reflections from the RF beams to generate radar data about the surrounding environment;
   encoding the radar data into an information-dense representation;
   identifying a target in the surrounding environment from the information-dense representation; and
   determining a next radar control action for the iMTM antenna structure.

17. The method of claim 16, further comprising training an autoencoder with a data set of unlabeled radar Range-Doppler ("RD") map data.

18. The method of claim 17, further comprising:
   sending weights and biases of the trained autoencoder to initialize a convolutional neural network (CNN);
   training the CNN with labeled RD map data;
   capturing radar data including RD map data with the trained CNN;
   encoding the captured radar data and RD map data with the autoencoder to generate an information-dense representation of the captured radar data and RD map data; and
   feeding the encoded RD map data to the CNN to identify a target from the captured radar data.

19. The method of claim 18, wherein determining the next radar control action comprises selecting the next radar control action with a deep neural network based at least on results from the CNN.

20. The method of claim 16, wherein the next radar control action includes one or more actions that cause steering of one or more RF beams to a same or different direction.

* * * * *